US012278580B2

(12) United States Patent
Pawar et al.

(10) Patent No.: US 12,278,580 B2
(45) Date of Patent: *Apr. 15, 2025

(54) SYSTEMS AND METHODS FOR CONTROLLING INDUCER MOTOR SPEED

(71) Applicant: Copeland Comfort Control LP, St. Louis, MO (US)

(72) Inventors: Harshal Manik Pawar, Pune (IN); John F. Broker, Warrenton, MO (US)

(73) Assignee: Copeland Comfort Control LP, St. Louis, MO (US)

( * ) Notice: Subject to any disclaimer, the term of this patent is extended or adjusted under 35 U.S.C. 154(b) by 198 days.

This patent is subject to a terminal disclaimer.

(21) Appl. No.: 18/118,311

(22) Filed: Mar. 7, 2023

(65) Prior Publication Data

US 2023/0208333 A1 Jun. 29, 2023

Related U.S. Application Data

(63) Continuation-in-part of application No. 17/481,859, filed on Sep. 22, 2021, now Pat. No. 11,611,302.

(30) Foreign Application Priority Data

Sep. 26, 2020 (IN) .............................. 202021041848

(51) Int. Cl.
 *H02P 25/04* (2006.01)
 *H02P 21/18* (2016.01)
 *H02P 27/04* (2016.01)

(52) U.S. Cl.
 CPC .............. *H02P 25/04* (2013.01); *H02P 21/18* (2016.02); *H02P 27/045* (2013.01)

(58) Field of Classification Search
 CPC ...... H02P 21/18; H02P 21/0003; H02P 25/04; H02P 27/16; H02P 27/045; H02P 25/062;
 (Continued)

(56) References Cited

U.S. PATENT DOCUMENTS 4,132,931 A   1/1979 Okuyama
4,713,744 A * 12/1987 Coston .................... H02P 27/16
                                                    363/160

(Continued)

FOREIGN PATENT DOCUMENTS

CN    208433925 U  *  1/2019  .......... H02P 23/0004
WO    WO-9807230 A1    2/1998
WO    WO-0150589 A1    7/2001

*Primary Examiner* — Bickey Dhakal
(74) *Attorney, Agent, or Firm* — Harness, Dickey & Pierce, P.L.C.; Anthony G. Fussner

(57) ABSTRACT

Disclosed are exemplary embodiments of systems and methods for controlling inducer motor speed. In an exemplary embodiment, a method includes changing stator voltage of an inducer motor (e.g., by changing a firing angle of a triac, using a transistor, a silicon controlled rectifier or semiconductor controlled rectifier (SCR), other switching device, etc.); determining actual inducer motor speed (e.g., by using a hall effect sensor or other speed sensor, etc.); and after determining the actual inducer motor speed, changing the motor stator voltage (e.g., by changing the firing angle of the triac, etc.) to a value at which the actual inducer motor speed is controllably regulated and/or maintained substantially at a set speed.

27 Claims, 9 Drawing Sheets

Block Diagram: Inducer Motor Speed Control

(58) Field of Classification Search
CPC ...... H02P 25/325; H02P 23/18; H02P 25/145; H02P 2205/07
See application file for complete search history.

(56) References Cited

U.S. PATENT DOCUMENTS

| | | | |
|---|---|---|---|
| 5,402,054 A * | 3/1995 | Eckersley | H02P 27/18 363/160 |
| 6,208,113 B1 | 3/2001 | Lelkes et al. | |
| 6,353,299 B1 | 3/2002 | Ramachandran et al. | |
| 7,109,616 B2 | 9/2006 | Grzywacz et al. | |
| 11,611,302 B2 | 3/2023 | Pawar et al. | |

* cited by examiner

Block Diagram: Inducer Motor Speed Control

Inducer Motor Graphical Representation

Hall Sensor Assembly

SYSTEMS AND METHODS FOR CONTROLLING INDUCER MOTOR SPEED

CROSS-REFERENCE TO RELATED APPLICATIONS

This application is a continuation-in-part of allowed U.S. patent application Ser. No. 17/481,859, which published on Mar. 31, 2022 as U.S. Patent Application Publication US2022/0103104 and issuing as U.S. Pat. No. 11,611,302 on Mar. 21, 2023. U.S. patent application Ser. No. 17/481,859 claims the benefit of and priority to Indian Patent Application No. 202021041848 filed Sep. 26, 2020. The entire disclosures of the above applications are incorporated herein by reference.

FIELD

The present disclosure relates to systems and methods for controlling inducer motor speed.

BACKGROUND

This section provides background information related to the present disclosure which is not necessarily prior art.

Single phase induction motors are commonly used as furnace inducer motors. A furnace inducer motor may be used to drive a fan for moving air through a furnace and heating vent pipes. The inducer motor-driven fan may also be used to remove harmful gases (e.g., carbon monoxide, nitrogen oxide, etc.) out through furnace vents.

The speed of a single induction phase motor may be controlled by changing the frequency of the line voltage or changing the voltage, to thereby change rotational speed of the single phase induction motor. Conventionally, triacs, hall effect sensors, and variable frequency drive (VFD) motor controllers have been used to control the speed of single phase induction motors to a set or desired revolutions per minute (RPM).

A variable frequency drive (VFD) is a type of motor controller that may be used to drive an electric motor by varying the frequency and voltage supplied to the electric motor, such as a fan or pump motor in a heating, ventilation and air conditioning (HVAC) system. A triac (triode for alternating current) is a three terminal electronic semiconductor device that conducts electrical current in either direction when triggered. A hall effect sensor is a device that may be used to measure the magnitude of a magnetic field, e.g., for speed detection, proximity sensing, position sensing, and current sensing.

DRAWINGS

The drawings described herein are for illustrative purposes only of selected embodiments and not all possible implementations, and is not intended to limit the scope of the present disclosure.

DETAILED DESCRIPTION

Example embodiments will now be described more fully with reference to the accompanying drawings.

As noted in the background above, triacs and hall effect sensors have been used to control the speed of single phase induction motors to a set/desired RPM. But as recognized herein, conventional methods have difficulty controlling the speed of a single phase induction motor to a set/desired RPM using a triac and hall effect sensor as the induction motor speed oscillates too much and does not stay constant. And the varying and oscillating induction motor speed may cause more or less air flow and/or may cause pressure switch (PSW) opening.

Accordingly, disclosed herein are exemplary embodiments of systems and methods that enable induction motor speed to be controlled more precisely to a set RPM substantially without any oscillations (e.g., without any appreciable detrimental oscillations, entirely without any oscillations, etc.). In exemplary embodiments, a switching device (e.g., a triac, transistor, a silicon controlled rectifier or semiconductor controlled rectifier (SCR), other suitable device, etc.) is used to control motor stator voltage so that speed of the motor is controllable. A speed sensor (e.g., a hall effect sensor, other device operable for measuring speed of a motor, etc.) is used to check or measure the actual inducer motor speed when the inducer stator voltage is changed (e.g., by varying the triac firing angle, etc.). After the actual inducer motor speed is obtained via the speed sensor, the motor stator voltage may be changed (e.g., by changing the triac firing angle, etc.) to the value that provides the desired inducer motor speed. Disclosed herein are exemplary methods (e.g., method 100 shown in FIG. 1, etc.) that help to controllably regulate and/or maintain constant inducer motor speed substantially without speed oscillations, e.g., for a single phase motor being used as inducer, etc. As recognized herein, conventional methods using triacs and hall effect sensors have failed to regulate inducer motor speed at a desired/set level, which may result in significant detrimental speed oscillations.

As also recognized herein, motor speed of shaded-pole induction motors and permanent split capacitor (PSC) induction motors is proportional to voltage. Higher voltage is higher speed, lower voltage is low speed for any given load. The triac is gated later to give a lower voltage and earlier for a higher voltage. An earlier gate signal would usually be a smaller firing angle and later a higher firing angle.

Figure 1:
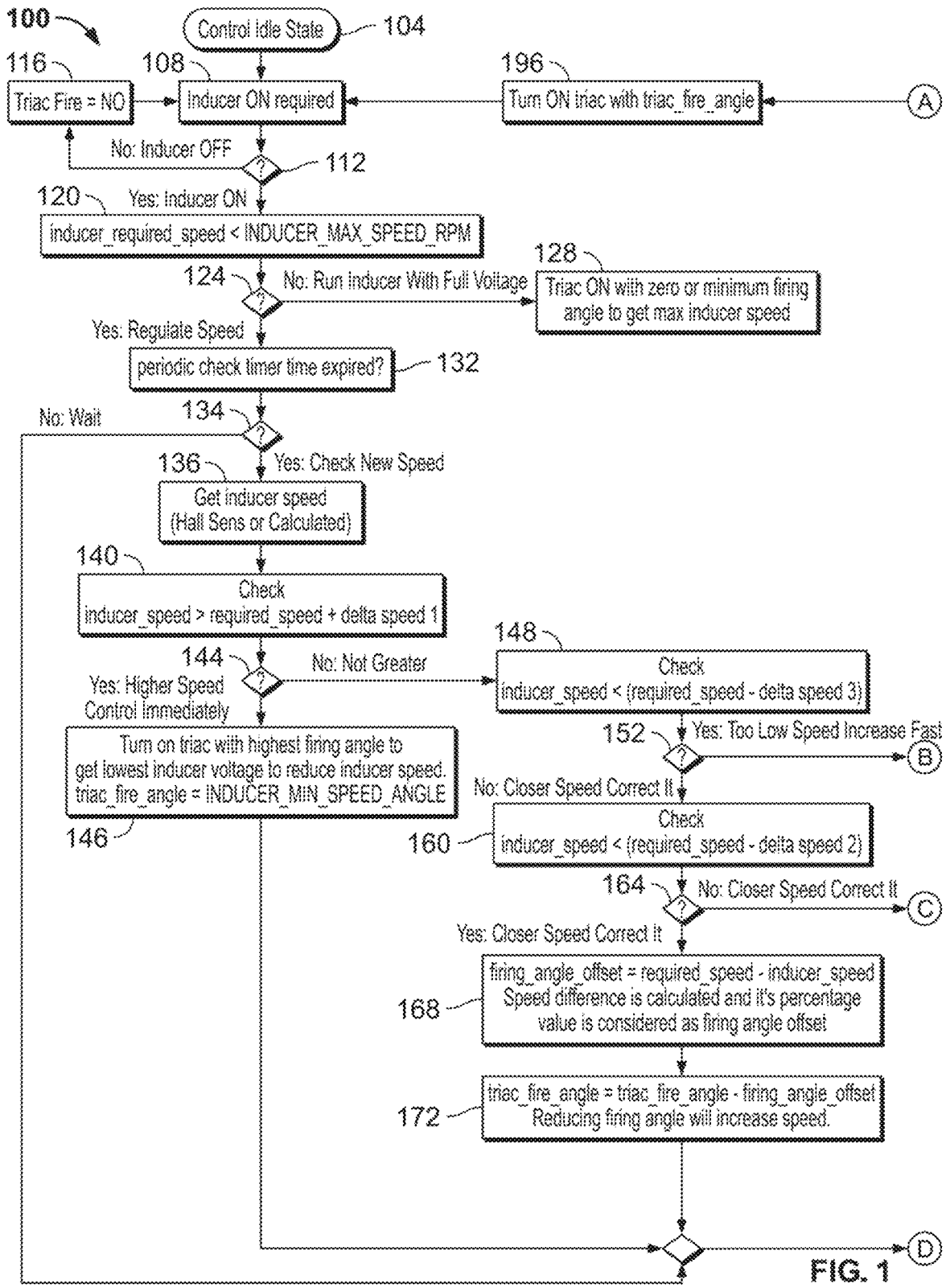
FIG. 1 is a flow chart illustrating an exemplary method of controlling inducer motor speed according to an exemplary embodiment.
Figure 1:
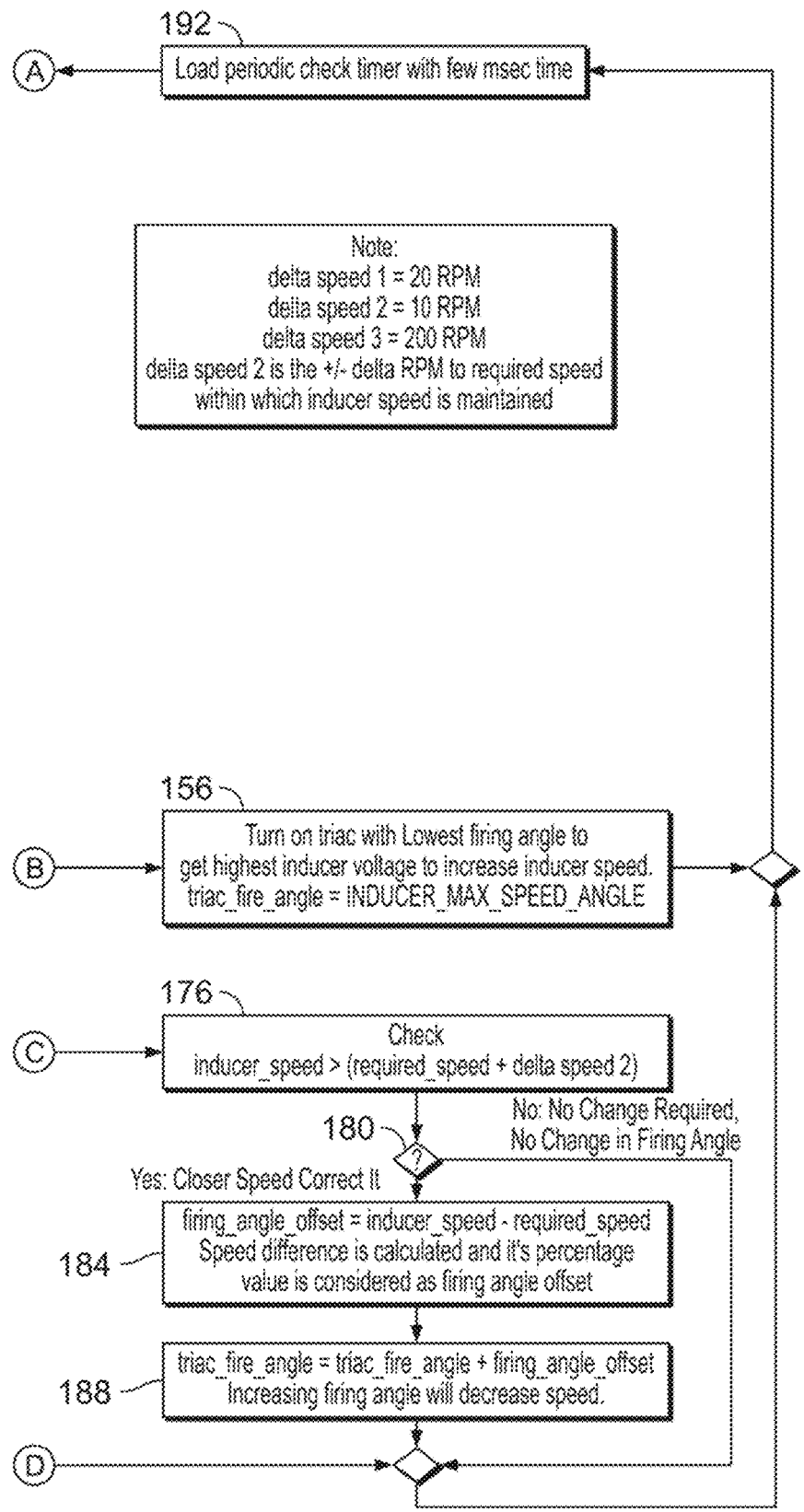
Figure 2:
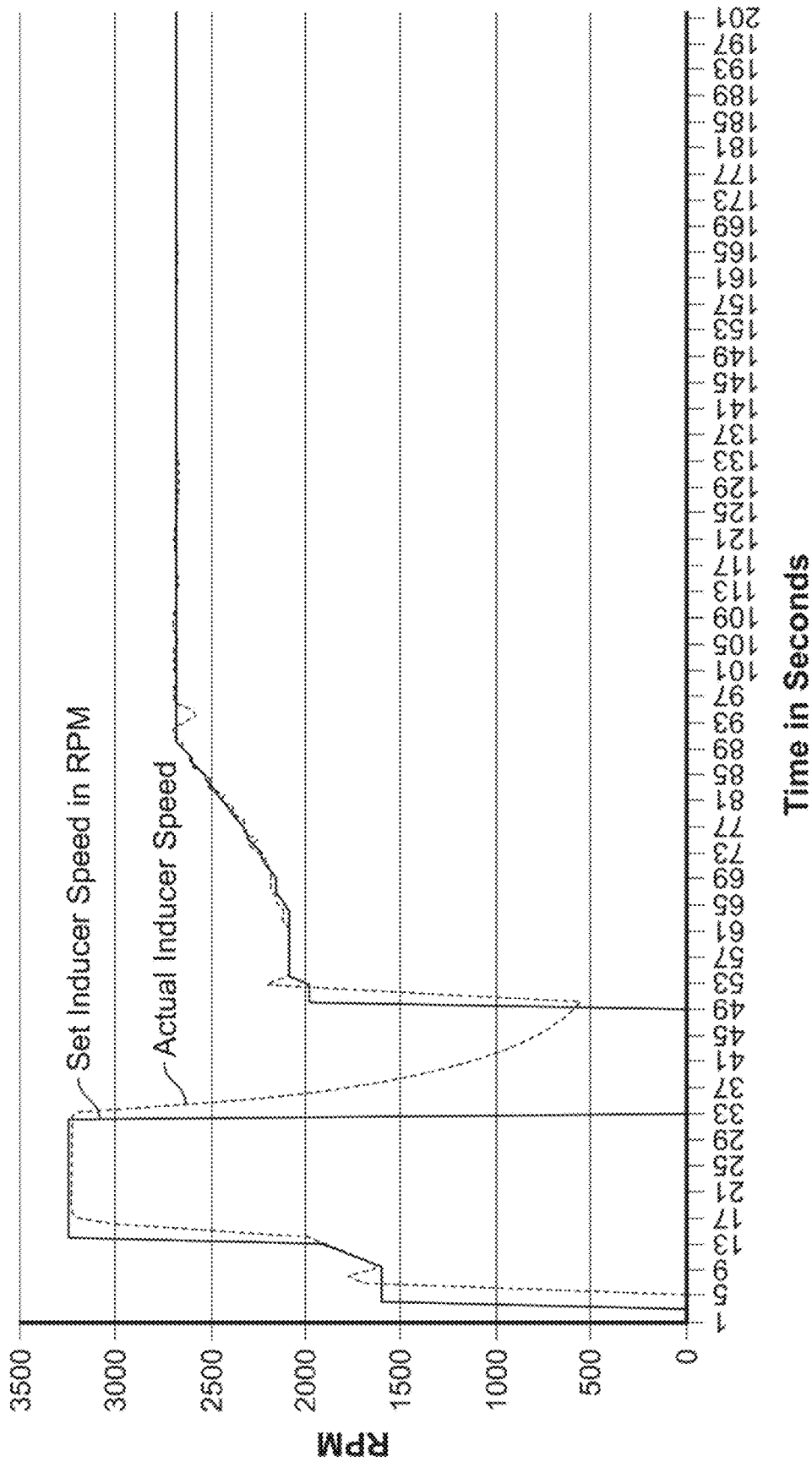
FIG. 2 is a line graph of actual inducer motor speed and set inducer motor speed in revolutions per minute (RPM) versus time in seconds, which results were obtained via the exemplary method shown in FIG. 1.
Figure 3:
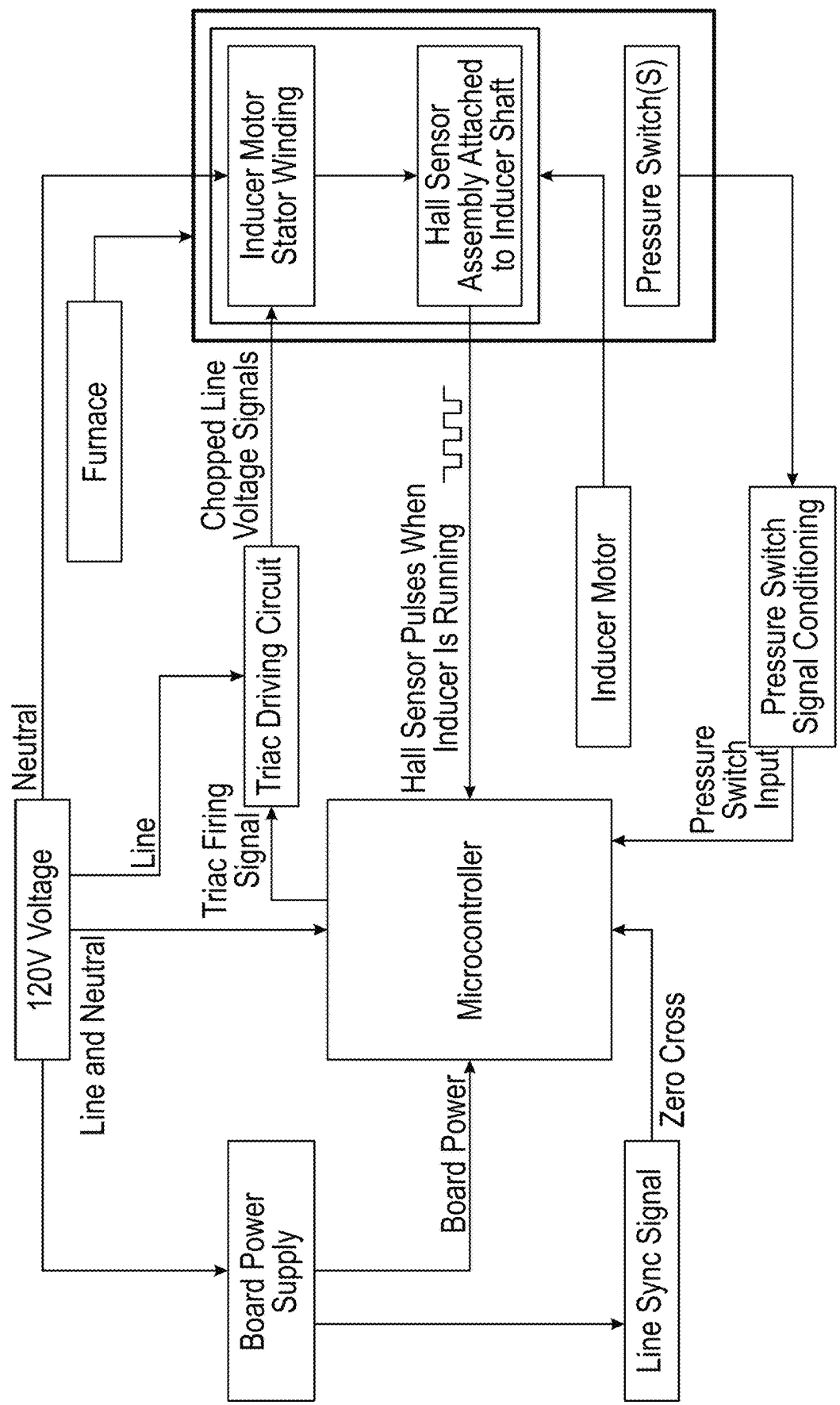
FIG. 3 is a block diagram of a system including an inducer motor with a hall sensor assembly, wherein the inducer motor may be controllable at a desired RPM in accordance with the exemplary method (e.g., algorithm, etc.) shown in FIG. 1 according to an exemplary embodiment.
Figure 4:
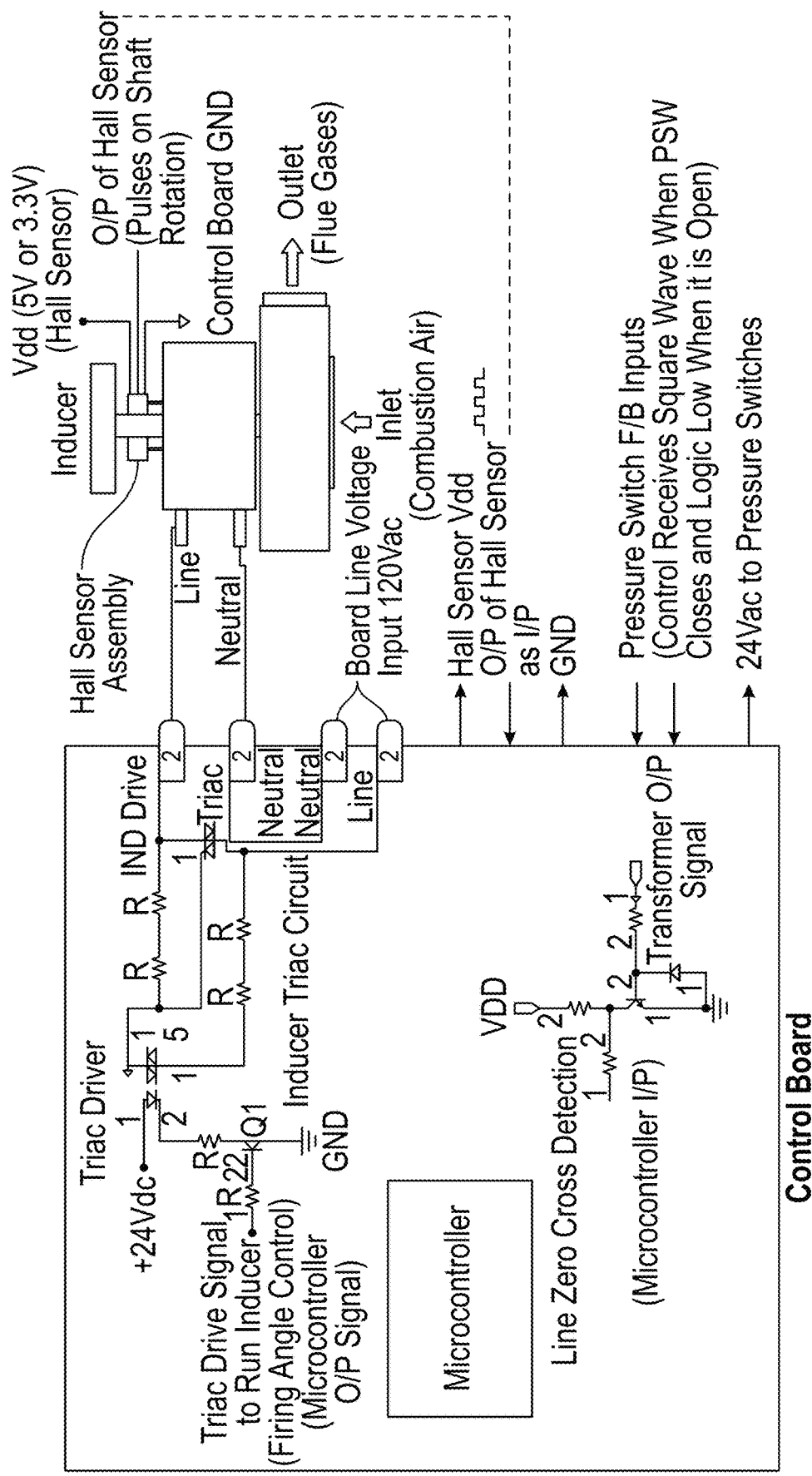
FIG. 4 is a graphical representation of an inducer motor with a hall sensor assembly and a control board including a triac drive circuit to run the inducer. The inducer motor may be controllable at a desired RPM in accordance with the exemplary method (e.g., algorithm, etc.) shown in FIG. 1 according to an exemplary embodiment.
Figure 5:
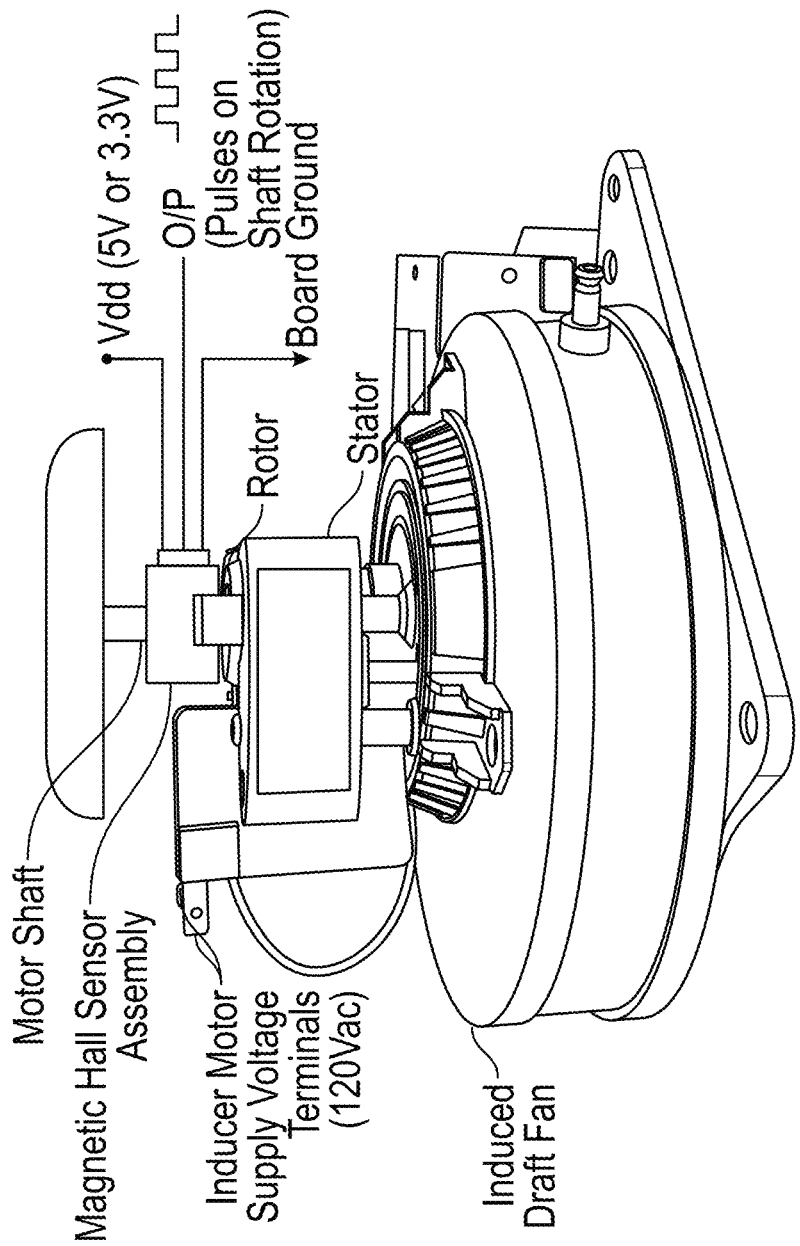
FIG. 5 shows an inducer including an inducer motor, motor shaft, magnetic hall sensor assembly, inducer motor supply voltage terminals, rotor, stator, and induced draft fan. The inducer motor may be controllable at a desired RPM in accordance with the exemplary method (e.g., algorithm, etc.) shown in FIG. 1 according to an exemplary embodiment.
Figure 6:
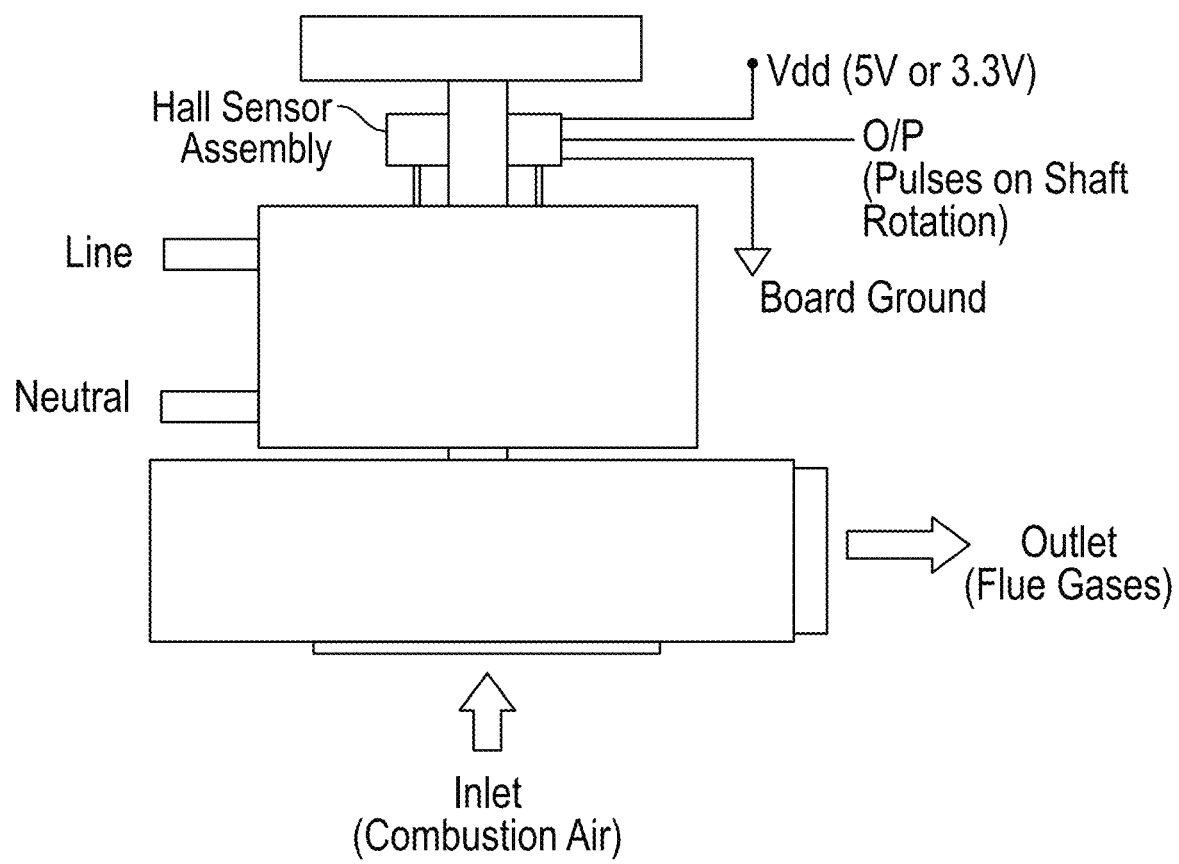
FIG. 6 is another graphical representation of the inducer motor with the hall sensor assembly shown in FIG. 4.
Figure 7:
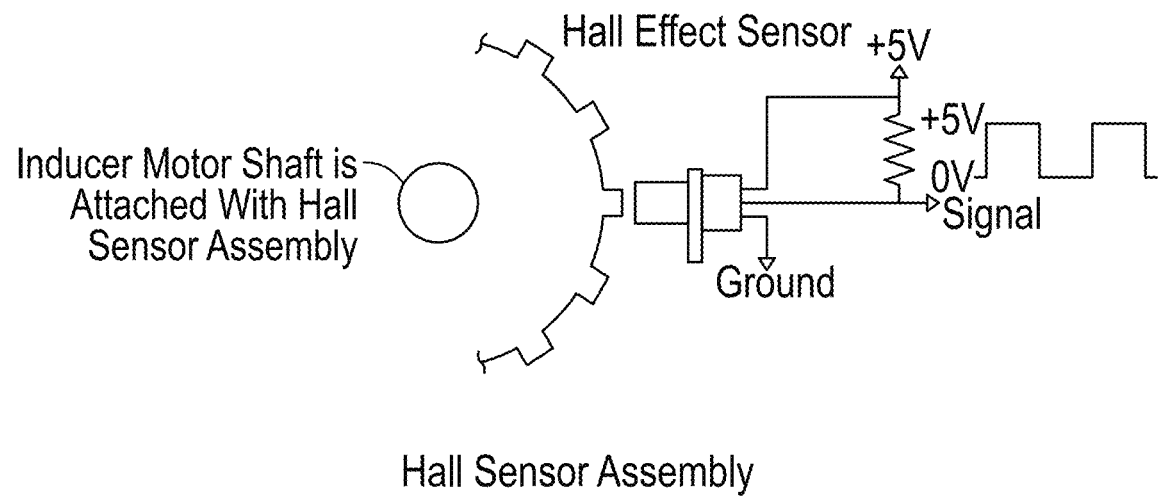
FIG. 7 illustrates a hall sensor assembly coupled with an inducer motor shaft, which may be used in exemplary embodiments of the present disclosure.
Figure 8:
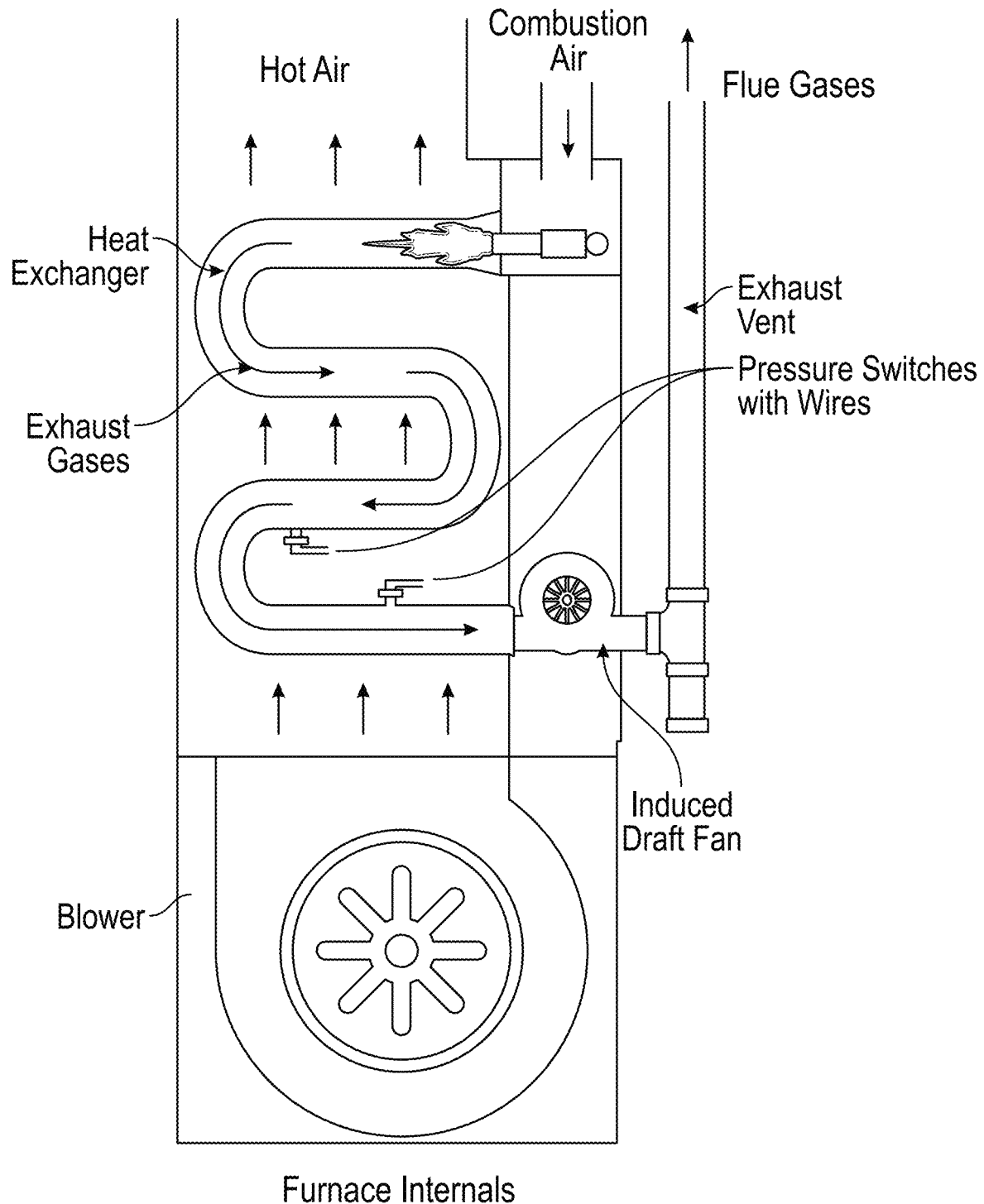
FIG. 8 illustrates furnace internals of an exemplary furnace in which may be used an inducer motor with a hall sensor assembly wherein the inducer motor may be controllable at a desired RPM in accordance with the exemplary method (e.g., algorithm, etc.) shown in FIG. 1 according to an exemplary embodiment.

With reference now to the figures, FIG. 1 shows a flow chart illustrating an exemplary method 100 of controlling inducer motor speed according to an exemplary embodiment. Initially, the method 100 may start with control in an idle state at 104 (Control Idle State) and require the inducer to be ON at 108 (Inducer ON required). At 112, the method 100 includes determining whether or not the inducer is ON. If the inducer is OFF, the triac is not fired as indicated at 116 (Triac Fire=NO), and the method 100 returns back to process 108. Although the exemplary method 100 includes using a triac to control the motor stator voltage, other exemplary embodiments may include other switching devices for controlling motor stator voltage such as transistors, silicon controlled rectifiers or semiconductor controlled rectifiers (SCR), etc.

If it is determined that the inducer is ON at 112, the method 100 proceeds to process 120 for a comparison of the inducer set or required speed (RPM) to the inducer max speed (RPM) (inducer_required_speed<INDUCER_MAX_SPEED_RPM). At 124, the method 100 includes determining whether the inducer required speed (RPM) is less than the inducer maximum speed (RPM).

If the inducer required speed (RPM) is the inducer maximum speed (RPM), the maximum motor speed may be obtained by running the motor with full line voltage. This may be achieved by having the triac ON with zero or minimum firing angle as indicated at 128.

If it is determined at 124 that the inducer required speed is less than the inducer max speed, then the method 100 proceeds to process 132 for controllably regulating inducer motor speed. At process 132, the method 100 includes periodically checking a timer to see if the time has expired. By way of example, the timer may be configured such that the time is within a range from 16 milliseconds to 96 milliseconds.

If it is determined at 134 that the timer's time has not expired, then the method 100 includes waiting.

But if it is determined at 134 that the timer's time has expired, then the method 100 proceeds to process 136 at which a hall effect sensor is used to obtain actual inducer motor speed. Although the exemplary method 100 includes using a hall effect sensor to obtain actual inducer motor speed, other exemplary embodiments may include other speed sensors or devices for measuring the speed of the motor.

At process 140, the method 100 includes determining whether or not actual inducer motor speed is greater than a sum of required inducer speed plus delta speed 1 (inducer_speed>(required_speed+delta speed 1)). In this example method 100, delta speed 1 equals 20 RPM, delta speed 2 equals 10 RPM, and delta speed 3 equals 200 RPM. Delta speed 2 is the +/−delta RPM to required speed within which inducer motor speed is maintained. Alternatively, other suitable RPM values may be used for delta speed 1, delta speed 2, and delta speed 3 in other exemplary embodiments. For example, delta speed 1 may be set to an RPM value within a range from 30 RPM to 60 RPM (e.g., 30 RPM, 40 RPM, 50 RPM, 60 RPM, etc.), delta speed 2 may be set to an RPM value within a range from 10 RPM to 30 RPM (e.g., 10 RPM, 20 RPM, 30 RPM etc.), and delta speed 3 may be set to an RPM value within a range from 100 RPM to 400 RPM (e.g., 100 RPM, 200 RPM, 300 RPM, 400 RPM, etc.).

If it is determined at 144 that actual inducer motor speed is greater than the sum of the required inducer motor speed plus delta speed 1, then the method 100 includes increasing speed control immediately at process 146. To increase the speed control at 146, the method 100 includes turning on the triac with the highest firing angle (broadly, a higher firing angle) to thereby obtain the lowest inducer voltage to reduce inducer motor speed (triac_fire_angle=INDUCER_MIN_SPEED_ANGLE).

But if it is determined at 144 that actual inducer motor speed is not greater than the sum of the required inducer motor speed plus delta speed 1, then the method 100 includes determining at 148 whether or not actual inducer motor speed is less than a difference of required inducer motor speed minus delta speed 3 (inducer_speed<(required_speed−delta speed 3). In this example method 100, delta speed 3 is 200 RPM.

If it is determined at 152 that actual inducer motor speed is less than the difference of required inducer motor speed minus delta speed 3, then the method 100 proceeds to process 156 to quickly increase the inducer motor speed that is too low. To increase the inducer motor speed at 156, the method 100 includes turning on the triac with the lowest firing angle (broadly, a lower firing angle) to thereby obtain the highest inducer voltage to increase inducer motor speed (triac_fire_angle=INDUCER_MAX_SPEED_ANGLE).

But if it is determined at 152 that actual inducer motor speed is not less than the difference of required inducer motor speed minus delta speed 3, then the method 100 proceeds to process 160 for closer or more precise inducer motor speed correction. At 160, the method 100 includes determining whether or not actual inducer motor speed is less than a difference of required inducer motor speed minus delta speed 2 (inducer_speed<(required speed−delta speed 2). In this example method 100, delta speed 2 is 10 RPM, and delta speed 2 refers to the +/−delta RPM to required speed within which inducer motor speed is maintained.

If it is determined at 164 that actual inducer motor speed is less than the difference of required inducer motor speed minus delta speed 2, then the method 100 proceeds to process 168 for closer or more precise inducer motor speed correction. At 168, the method includes calculating a speed difference (e.g., less than 10 RPM, etc.) of required inducer motor speed minus actual inducer motor speed. A percentage value (e.g., 25%, etc.) of the speed difference is considered as a triac firing angle offset (firing_angle_offset=required_speed−inducer_speed). At 172, the method 100 includes reducing the triac firing angle by the offset to thereby to increase inducer motor speed (triac_fire_angle=triac_fire_angle−firing_angle_offset).

For example, the speed difference would be 20 RPM if the required speed is 2000 RPM and the actual speed is 1980 RPM. In this example, the speed difference of 20 RPM exceeds the 10 RPM delta speed 2. And 25% of 20 RPM speed difference is 5 RPM. This value of 5 is used as the firing angle change or offset from the existing triac firing angle. As another example, the speed difference would be 5 RPM if the required speed is 2000 RPM and the actual speed is 1995 RPM. Because the speed difference of 5 RPM is less than the 10 RPM delta speed 2, there is no change in the existing firing angle. Thus, as the error increases, the firing angle changes accordingly.

But if it is determined at 164 that actual inducer motor speed is not less than the difference of required inducer motor speed minus delta speed 2, then the method 100 proceeds to process 176 for closer or more precise inducer motor speed correction. At 176, the method 100 includes determining whether or not actual inducer motor speed is greater than a sum of required inducer motor speed plus delta speed 2 (inducer_speed>(required_speed+delta speed 2). In this example method 100, delta speed 2 is 10 RPM, and delta speed 2 is the +/−delta RPM to required speed within which inducer motor speed is maintained.

If it is determined at 180 that actual inducer motor speed is not greater than the sum of required inducer motor speed plus delta speed 2, then no change is required. Accordingly, the triac firing angle is not changed.

But if it is determined at 180 that actual inducer motor speed is greater than the sum of required inducer motor speed plus delta speed 2, then the method 100 proceeds to process 184 for closer or more precise inducer motor speed correction. At 184, the method includes calculating a speed difference (e.g., 10 RPM, etc.) actual inducer motor speed minus required inducer motor speed. The percentage value (e.g., 25%, etc.) of the speed difference is considered as a triac firing angle offset (firing_angle_offset=inducer_speed−required_speed). At 188, the method 100 includes increasing the triac firing angle by the offset to decrease inducer motor speed (triac_fire_angle=triac_fire_angle+firing_angle_offset).

For example, the speed difference would be 25 RPM if the required speed is 2000 RPM and the actual speed is 2025 RPM. In this example, the speed difference of 25 RPM exceeds the 10 RPM delta speed 2. And 25% of 25 RPM speed difference is 6.25 RPM. This value of 6.25 is used as the firing angle change or offset from the existing triac firing angle. As another example, the speed difference would be 5 RPM if the required speed is 2000 RPM and the actual speed is 2005 RPM. Because the speed difference of 5 RPM is less than the 10 RPM delta speed 2, there is no change in the existing firing angle. Thus, as the error increases, the firing angle changes accordingly.

Also shown in FIG. 1, the method 100 also includes load periodic check timer at 192 (e.g., with a few milliseconds, etc.). The method 100 further includes turn on triac with triac_fire_angle at 196 before returning back to process 108.

Disclosed are exemplary embodiments of systems and methods for controlling inducer motor speed. In exemplary embodiments, a method includes changing stator voltage of an inducer motor (e.g., by changing a firing angle of a triac, using a transistor, a silicon controlled rectifier or semiconductor controlled rectifier (SCR), other switching device, etc.); determining actual inducer motor speed (e.g. using a hall effect sensor or other speed sensor, etc.); and after determining the actual inducer motor, changing the motor stator voltage (e.g., by changing the firing angle of the triac, etc.) to a value at which the actual inducer motor speed is controllably regulated and/or maintained substantially at a set speed.

For example, an exemplary method may include changing stator voltage of an inducer motor by changing a firing angle of a triac; determining actual inducer motor speed by using a hall effect sensor; and after determining the actual inducer motor speed via the hall effect sensor, changing the firing angle of the triac to a triac firing angle value at which the actual inducer motor speed is controllably regulated and/or maintained substantially at a set speed.

After determining the actual inducer motor speed, the method may include changing the stator voltage of the inducer motor such that the actual inducer motor speed is controllably regulated and/or maintained substantially at the set speed within less than 4 seconds and/or substantially without any speed oscillations and/or such that the actual inducer motor speed is controllably regulated and/or maintained substantially at the set speed within thirty revolutions per minute (e.g., 10 RPM, 20 RPM, 30 RPM, etc.) of the set speed. The speed control time depends upon how much the actual inducer motor speed deviated from the required or set speed. For example, if the deviation (speed difference) is 10 RPM to 200 RPM, it may take 0.5 to 2 seconds to controllably regulate the actual inducer motor speed to the set speed. Or, for example, if the actual speed and required/set speed differs by more than 500 RPM, it may take 2 to 3 seconds. By way of example, the control may be configured such that it can take speed corrective action every 32 milliseconds.

In an exemplary embodiment, the method includes determining whether the set speed is less than a maximum speed of the inducer motor. If it is determined that the set speed is less than the maximum speed of the inducer motor, then the method includes regulating the actual inducer motor speed.

Regulating the actual inductor motor speed includes determining whether a predetermined amount of time has expired. If it is determined that the predetermined amount of time has not expired, then the method includes waiting. If it is determined that the predetermined amount of time has expired, then the method includes determining the actual inducer motor speed (e.g., by using a hall effect sensor or other speed sensor, etc.).

After determining the actual inducer motor speed, the method includes determining whether the actual inducer motor speed is greater than a sum of the set speed plus a first delta speed. If it is determined that the actual inducer motor speed is greater than the sum of the set speed plus the first delta speed, then the method includes reducing the actual inducer motor speed by using a switching device (e.g., a triac, a transistor, a silicon controlled rectifier or semiconductor controlled rectifier (SCR), other switching device, etc.) with a higher (e.g., highest) firing angle to thereby obtain a lowest stator voltage for the inducer motor.

If it is determined that the actual inducer motor speed is not greater than the sum of the set speed plus the first delta speed, then the method includes determining whether the actual inducer motor speed is less than a difference of the set speed minus a third delta speed.

If it is determined that the actual inducer motor speed is less than the difference of the set speed minus the third delta speed, then the method includes increasing the actual inducer motor speed by using the switching device with a lower (e.g., lowest) firing angle to thereby obtain a highest stator voltage or the inducer motor. If it is determined that the actual inducer motor speed is not less than the difference of the set speed minus the third delta speed, then the method includes determining whether the actual inducer motor speed is less than a difference of set speed minus a second delta speed.

If it is determined that the actual inducer motor speed is less than the difference of set speed minus the second delta speed, then the method includes reducing the firing angle of the switching device by a first offset that is a first percentage value of a difference of the set speed minus the actual inducer motor speed, to thereby increase the actual inducer motor speed. If it is determined that the actual inducer motor speed is not less than the difference of set speed minus the second delta speed, then the method includes determining whether the actual inducer motor speed is greater than a sum of the set speed plus the second delta speed.

If it is determined that the actual inducer motor speed is not greater than the sum of the set speed plus the second delta speed, then the method includes maintaining or not changing the firing angle of the switching device. If it is determined that the actual inducer motor speed is greater than the sum of the set speed plus the second delta speed, then the method includes increasing the firing angle of the switching device by a second offset that is a second percentage value of a difference of the actual inducer motor speed minus the set speed, to thereby decrease the actual inducer motor speed.

In this exemplary method, the first delta speed is 20 revolutions per minute (RPM), the second delta speed is 10 RPM, and the third delta speed is 200 RPM. The second delta speed is the +/−delta RPM to the set speed within which inducer motor speed is maintained. Also in this exemplary method, the first and second percentage values may each be 25%. In another exemplary method, the first delta speed may be set to an RPM value within a range from 30 RPM to 60 RPM, the second delta speed may be set to an RPM value within a range from 10 RPM to 30 RPM, the third delta speed may be set to an RPM value within a range from 100 RPM to 400 RPM, and the first and second percentage values may each be higher or lower than 25%.

In exemplary embodiments, the method may include maintaining the actual inducer motor speed constant substantially at the set speed (e.g., within 10 RPM, etc.) if line voltage changes to the inducer motor. The inducer motor may comprise a single phase motor configured for use and/or being used as a furnace inducer. Exemplary embodiments include a system configured for controlling inducer motor speed according to the method(s) disclosed herein. For example, an exemplary system may include a triac configured to be operable for changing stator voltage of the inducer motor by changing the firing angle of the triac; a hall effect sensor configured to be operable for determining the actual inducer motor speed; and a control configured to be operable for changing the firing angle of the triac to the value at which the actual inducer motor speed is controllably regulated and/or maintained substantially at the set speed substantially without any speed oscillations.

In an exemplary embodiment, a system for controlling inducer motor speed includes a switching device, a speed sensor, and a control. The switching device is configured to be operable for changing stator voltage of an inducer motor. The speed sensor is configured to be operable for determining actual inducer motor speed. The control is configured to be operable for changing the stator voltage of the inducer motor to a value at which the actual inducer motor speed is controllably regulated and/or maintained substantially at a set speed substantially without any speed oscillations.

The switching device may comprise a triac configured to be operable for changing the stator voltage of the inducer motor by changing a firing angle of the triac. The control may be configured to be operable for changing the firing angle of the triac to a triac firing angle value at which the actual inducer motor speed is controllably regulated and/or maintained substantially at a set speed substantially without any speed oscillations. Other exemplary embodiments may include other switching devices for controlling motor stator voltage such as transistors, silicon controlled rectifiers or semiconductor controlled rectifiers (SCR), etc.

The speed sensor may comprise a hall effect sensor configured to be operable for determining actual inducer motor speed. But other exemplary embodiments may include other speed sensors or devices for determining actual inducer motor speed.

In exemplary embodiments, the control comprises a proportional-integral-derivative (PID), proportional-integral (PI), and/or a proportional-derivative (PD) controller that is configured to be operable for changing the stator voltage of the inducer motor to the value at which the actual inducer motor speed is controllably regulated and/or maintained substantially at the set speed substantially without any speed oscillations by using the proportional-integral-derivative (PID), proportional-integral (PI), and/or a proportional-derivative (PD) process.

The system may be configured to be operable for controllably regulating and/or maintained the actual inducer motor speed within 30 RPM (e.g., 10 RPM, 20 RPM, 30 RPM, etc.) of the set speed without speed oscillations. A modulating furnace may include a furnace inducer and the system that is configured for controlling speed of the furnace inducer.

In exemplary embodiments, a method includes changing the stator voltage of the inducer motor to a value at which the actual inducer motor speed is controllably regulated and/or maintained substantially at the set speed substantially without any speed oscillations by using a proportional-integral-derivative (PID), proportional-integral (PI), and/or a proportional-derivative (PD) process or controller.

Exemplary embodiments of the systems and methods disclosed herein may include or provide one or more (but not necessarily any or all) of the following advantages or features, such as:

Enable replacement of conventional variable frequency drive (VFD) mechanisms with lower cost triac circuitry for modulating furnaces as disclosed exemplary embodiments may be used to precisely regulate inducer motor speed at a set/desired speed;

Usable in Low NOX controls;

Maintain inducer motor speed at set speed in a short time (e.g., less than a few seconds, etc.) substantially without any oscillations (e.g., without any significant oscillations, without any oscillations, etc.);

Maintain constant inducer motor speed if line voltage changes; and

Faster response time to a newly requested inducer motor speed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. For example, when permissive phrases, such as "may comprise", "may include", and the like, are used herein, at least one embodiment comprises or includes the feature(s). As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of controlling inducer motor speed, the method comprising:
    changing stator voltage of an inducer motor;
    determining actual inducer motor speed; and
    after determining the actual inducer motor speed, changing the stator voltage of the inducer motor to a value at which the actual inducer motor speed is controllably regulated and/or maintained substantially at a set speed without substantial speed oscillations;
    wherein after determining the actual inducer motor speed, the method includes:
        determining whether the actual inducer motor speed is greater than a sum of the set speed plus a first delta speed; and
        upon determining that the actual inducer motor speed is greater than the sum of the set speed plus the first delta speed, then the method includes reducing the actual inducer motor speed by using a switching device with a higher firing angle to thereby obtain a lower stator voltage for the inducer motor; and
    wherein upon determining that the actual inducer motor speed is not greater than the sum of the set speed plus the first delta speed, then the method includes determining whether the actual inducer motor speed is less than a difference of the set speed minus a third delta speed.

2. The method of claim 1, wherein the method includes reducing the actual inducer motor speed by using a switching device with a highest firing angle to thereby obtain a lowest stator voltage for the inducer motor.

3. The method of claim 1, wherein upon determining that the actual inducer motor speed is less than the difference of the set speed minus the third delta speed, then the method includes increasing the actual inducer motor speed by using the switching device with a lower firing angle to thereby obtain a higher stator voltage for the inducer motor.

4. The method of claim 3, wherein increasing the actual inducer motor speed by using the switching device with a lower firing angle to thereby obtain a higher stator voltage for the inducer motor comprises increasing the actual inducer motor speed by using the switching device with a lowest firing angle to thereby obtain a highest stator voltage for the inducer motor.

5. The method of claim 3, wherein upon determining that the actual inducer motor speed is not less than the difference of the set speed minus the third delta speed, then the method includes determining whether the actual inducer motor speed is less than a difference of set speed minus a second delta speed.

6. The method of claim 5, wherein:
upon determining that the actual inducer motor speed is less than the difference of set speed minus the second delta speed, then the method includes reducing the firing angle of the switching device by a first offset that is a first percentage value of a difference of the set speed minus the actual inducer motor speed, to thereby increase the actual inducer motor speed; or
upon determining that the actual inducer motor speed is not less than the difference of set speed minus the second delta speed, then the method includes determining whether the actual inducer motor speed is greater than a sum of the set speed plus the second delta speed.

7. The method of claim 6, wherein:
upon determining that the actual inducer motor speed is not greater than the sum of the set speed plus the second delta speed, then the method includes maintaining the firing angle of the switching device; or
upon determining that the actual inducer motor speed is greater than the sum of the set speed plus the second delta speed, then the method includes increasing the firing angle of the switching device by a second offset that is a second percentage value of a difference of the actual inducer motor speed minus the set speed, to thereby decrease the actual inducer motor speed.

8. The method of claim 7, wherein:
the first delta speed is within a range from 30 revolutions per minute to 60 revolutions per minute;
the second delta speed is within a range from 100 revolutions per minute to 30 revolutions per minute; and
the third delta speed is within a range from 100 revolutions per minute to 400 revolutions per minute.

9. The method of claim 8, wherein:
the first percentage value is 25%, and the second percentage value is 25%; and/or
the switching device comprises a triac configured to be operable for changing the stator voltage of the inducer motor by changing a firing angle of the triac; and/or
the first delta speed is 20 revolutions per minute, the second delta speed is 10 revolutions per minute; and the third delta speed is 200 revolutions per minute.

10. The method of claim 1, wherein:
changing stator voltage of the inducer motor comprises changing a firing angle of a triac; and
after determining the actual inducer motor speed, the method includes changing the firing angle of the triac to a triac firing angle value at which the actual inducer motor speed is controllably regulated and/or maintained substantially at the set speed.

11. The method of claim 1, wherein determining actual inducer motor speed comprises using a hall effect sensor.

12. The method of claim 1, wherein after determining the actual inducer motor speed, the method includes changing the stator voltage of the inducer motor such that the actual inducer motor speed is controllably regulated and/or maintained at the set speed within less than 4 seconds and without significant speed oscillations.

13. The method of claim 1, wherein after determining the actual inducer motor speed, the method includes changing the stator voltage of the inducer motor such that the actual inducer motor speed is controllably regulated and/or maintained to be within thirty revolutions per minute or less of the set speed.

14. The method of claim 1, wherein the method includes:
determining whether the set speed is less than a maximum speed of the inducer motor; and
regulating the actual inducer motor speed if it is determined that the set speed is less than the maximum speed of the inducer motor.

15. The method of claim 14, wherein regulating the actual inductor motor speed includes determining whether a predetermined amount of time has expired; and
upon determining that the predetermined amount of time has not expired, then the method includes waiting; or
upon determining that the predetermined amount of time has expired, then the method includes determining the actual inducer motor speed.

16. The method of claim 1, wherein the method includes maintaining the actual inducer motor speed constant substantially at the set speed if line voltage changes to the inducer motor.

17. The method of claim 1, wherein the inducer motor comprises a single phase motor configured for use as a furnace inducer.

18. The method of claim 1, wherein after determining the actual inducer motor speed, the method includes changing the stator voltage of the inducer motor to the value at which the actual inducer motor speed is controllably regulated and/or maintained substantially at the set speed without significant speed oscillations by using a proportional-integral-derivative (PID), proportional-integral (PI), and/or a proportional-derivative (PD) control method.

19. A system configured for controlling inducer motor speed according to the method of claim 1.

20. A system for controlling inducer motor speed, the system comprising:
a switching device configured to be operable for changing stator voltage of an inducer motor;
a speed sensor configured to be operable for determining actual inducer motor speed; and
a control configured to be operable for changing the stator voltage of the inducer motor to a value at which the actual inducer motor speed is controllably regulated and/or maintained substantially at a set speed without significant speed oscillations;
wherein:
the control is operable for determining whether the actual inducer motor speed is greater than a sum of the set speed plus a first delta speed; and
upon the control determines that the actual inducer motor speed is greater than the sum of the set speed plus the first delta speed, then the control is operable for reducing the actual inducer motor speed by using the switching device with a higher firing angle to thereby obtain a lower stator voltage for the inducer motor;

wherein if the control determines that the actual inducer motor speed is not greater than the sum of the set speed plus the first delta speed, then the control is operable for determining whether the actual inducer motor speed is less than a difference of the set speed minus a third delta speed.

21. The system of claim 20, wherein the control is operable for reducing the actual inducer motor speed by using the switching device with a highest firing angle to thereby obtain a lowest stator voltage for the inducer motor.

22. The system of claim 20, wherein if the control determines that the actual inducer motor speed is less than the difference of the set speed minus the third delta speed, then the control is operable for increasing the actual inducer motor speed by using the switching device with a lower firing angle to thereby obtain a higher stator voltage for the inducer motor.

23. The system of claim 22, wherein the control is operable for increasing the actual inducer motor speed by using the switching device with a lowest firing angle to thereby obtain a highest stator voltage for the inducer motor.

24. The system of claim 20, wherein the control comprises a proportional-integral-derivative (PID), proportional-integral (PI), and/or a proportional-derivative (PD) controller that is configured to be operable for changing the stator voltage of the inducer motor to the value at which the actual inducer motor speed is controllably regulated and/or maintained substantially at the set speed without significant speed oscillations by using the proportional-integral-derivative (PID), proportional-integral (PI), and/or a proportional-derivative (PD) control method.

25. The system of claim 20, wherein:
the switching device comprises a triac configured to be operable for changing the stator voltage of the inducer motor by changing a firing angle of the triac;
the speed sensor comprises a hall effect sensor configured to be operable for determining actual inducer motor speed; and
the control is configured to be operable for changing the firing angle of the triac to a triac firing angle value at which the actual inducer motor speed is controllably regulated and/or maintained substantially at a set speed without significant speed oscillations.

26. The system of claim 20, wherein the system is configured to be operable for controllably regulating and/or maintaining the actual inducer motor speed to be within thirty revolutions per minute of the set speed without significant speed oscillations.

27. A modulating furnace comprising a furnace inducer and the system of claim 20 configured for controlling speed of the furnace inducer.

* * * * *